United States Patent
Niu et al.

(10) Patent No.: US 10,192,694 B2
(45) Date of Patent: Jan. 29, 2019

(54) INTERLOCKING CONTROL DEVICE OF MULTIPLE-UNIT TRAIN SAFETY CIRCUIT

(71) Applicant: CRRC QINGDAO SIFANG CO., LTD., Qingdao, Shandong (CN)

(72) Inventors: Buzhao Niu, Shandong (CN); Jinghai Jiao, Shandong (CN); Xinkai Fang, Shandong (CN); Donghua Wu, Shandong (CN); Guidong Tao, Shandong (CN); Guimei Deng, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/738,574

(22) PCT Filed: Nov. 17, 2016

(86) PCT No.: PCT/CN2016/106217
§ 371 (c)(1),
(2) Date: Dec. 20, 2017

(87) PCT Pub. No.: WO2017/143808
PCT Pub. Date: Aug. 31, 2017

(65) Prior Publication Data
US 2018/0190443 A1     Jul. 5, 2018

(30) Foreign Application Priority Data

Feb. 26, 2016    (CN) .......................... 2016 1 0108643

(51) Int. Cl.
*B60L 3/00* (2006.01)
*H01H 9/26* (2006.01)
*H01H 9/28* (2006.01)

(52) U.S. Cl.
CPC ................. *H01H 9/26* (2013.01); *B60L 3/00* (2013.01); *H01H 9/285* (2013.01)

(58) Field of Classification Search
CPC . B60L 3/00; H01H 9/26; H01H 9/265; H01H 9/28; H01H 9/285
See application file for complete search history.

(56) References Cited

U.S. PATENT DOCUMENTS

2013/0112295 A1* 5/2013 McNicholas ........... F17C 13/02
137/551
2013/0333552 A1* 12/2013 Foitzik .................. B60L 3/0076
92/140
(Continued)

FOREIGN PATENT DOCUMENTS

CN        1962306 A       5/2007
CN      201304910 Y       9/2009
(Continued)

OTHER PUBLICATIONS

International Search Report for PCT/CN2016/106217, dated Feb. 22, 2017, ISA/CN.
(Continued)

*Primary Examiner* — Jason C Smith
(74) *Attorney, Agent, or Firm* — U.S. Fairsky LLP; Yue (Robert) Xu

(57) ABSTRACT

An interlocking control device for a multiple-unit safety circuit is provided, which includes: a protective grounding switch control branch which includes: a pantograph rising pneumatic circuit cut-off valve, a protective grounding switch turn-off pneumatic circuit cut-off valve and a protective grounding switch turn-off solenoid valve which are connected in series. When high-voltage equipment of a multiple-unit train is under maintenance or is powered by an external power supply, a protective grounding switch is turned on, cocks of the pantograph rising pneumatic circuit
(Continued)

cut-off valve and the protective grounding switch turn-off pneumatic circuit cut-off valve are rotated to open a cover of a key box, the protective grounding switch control branch is disconnected, the protective grounding switch turn-off solenoid valve connected in series in the protective grounding switch control branch is powered off to maintain the protective grounding switch in an on state.

10 Claims, 3 Drawing Sheets

(56) References Cited

U.S. PATENT DOCUMENTS

| | | | | |
|---|---|---|---|---|
| 2014/0154537 | A1* | 6/2014 | Damon | B60L 3/0046 |
| | | | | 429/62 |
| 2014/0211345 | A1* | 7/2014 | Thompson | B60L 11/1816 |
| | | | | 361/42 |
| 2017/0288379 | A1* | 10/2017 | Wang | B61C 17/00 |
| 2018/0190443 | A1* | 7/2018 | Niu | H01H 9/285 |

FOREIGN PATENT DOCUMENTS

| | | |
|---|---|---|
| CN | 201538250 U | 8/2010 |
| CN | 103213505 A | 7/2013 |
| CN | 104890519 A | 9/2015 |
| CN | 105575700 A | 5/2016 |
| CN | 205487828 U | 8/2016 |
| JP | S59210167 A | 11/1984 |
| JP | H0216931 Y2 | 5/1990 |
| JP | H0458701 A | 2/1992 |
| JP | H0476530 U | 7/1992 |
| JP | 2009136142 A | 6/2009 |
| JP | 2014100000 A | 5/2014 |

OTHER PUBLICATIONS

Hao, Mingyuan, et al., Key Locking of CRH3C EMUs and Maintenance Safety, Electric Drive for Locomotives, Jan. 10, 2013, pp. 17-19, 01, ISSN: 1000-128X, Ji Che Dian Chuan Dong Bian Ji Bu, Zhuzhou, Hunan, China.

First Office Action dated Nov. 12, 2018 for Japanese patent application No. 2018-527206, 5 pages.

* cited by examiner

INTERLOCKING CONTROL DEVICE OF MULTIPLE-UNIT TRAIN SAFETY CIRCUIT

This application is the national phase of International Application No. PCT/CN2016/106217, titled "INTERLOCKING CONTROL DEVICE OF MULTIPLE-UNIT TRAIN SAFETY CIRCUIT", filed on Nov. 17, 2016, which claims the priority to Chinese Patent Application No. 201610108643.7, titled "INTERLOCKING CONTROL DEVICE OF MULTIPLE-UNIT TRAIN SAFETY CIRCUIT", filed with the Chinese State Intellectual Property Office on Feb. 26, 2016, both of which are incorporated herein by reference in their entireties.

FIELD

The present disclosure relates to the technical field of multiple-unit safety control, and particularly to an interlocking control device of a multiple-unit safety circuit.

BACKGROUND

During normal operation of a multiple-unit train, a pantograph is in contact with an overhead contact line, by which the multiple-unit train is supplied with a high voltage. When high-voltage equipment on the multiple-unit train is under inspection and maintenance, it is critical to make sure that no current flows through the high-voltage circuit, to ensure the safety of operating personnel and related equipment.

Therefore, it is necessary for those skilled in the art to provide an interlocking control device for a multiple-unit safety circuit, to ensure the safety of operating personnel and related equipment during inspection and maintenance of high-voltage equipment on the multiple-unit train.

SUMMARY

In order to solve the above technical issue in the conventional technology, an interlocking control device for a multiple-unit safety circuit is provided according to the present disclosure. With the interlocking control device for a multiple-unit safety circuit, the safety of operating personnel and related equipment is ensured during inspection and maintenance of high-voltage equipment on the multiple-unit train.

An interlocking control device for a multiple-unit safety circuit is provided according to an embodiment of the present disclosure, which includes:

a protective grounding switch control branch which includes: a pantograph rising pneumatic circuit cut-off valve, a protective grounding switch turn-off pneumatic circuit cut-off valve and a protective grounding switch turn-off solenoid valve which are connected in series, where when high-voltage equipment of a multiple-unit train is under inspection and maintenance or is powered by an external power supply, a protective grounding switch is turned on, a cock of the pantograph rising pneumatic circuit cut-off valve and a cock of the protective grounding switch turn-off pneumatic circuit cut-off valve are rotated to pen a cover of a key box, the protective grounding switch control branch is disconnected, the protective grounding switch turn-off solenoid valve connected in series in the protective grounding switch control branch is powered off to maintain the protective grounding switch in an on state; and the cover of the key box is mechanically locked by means of the pantograph rising pneumatic circuit cut-off valve and the protective grounding switch turn-off pneumatic circuit cut-off valve.

Preferably, the interlocking control device for a multiple-unit safety circuit may further include:

an unlocking control branch which includes: an unlocking button, an auxiliary contact of the protective grounding switch and an unlocking relay coil which are connected in series, where the unlocking button is located on the key box;

the auxiliary contact of the protective grounding switch is closed when the protective grounding switch is turned on; and the unlocking relay coil is powered on to release a key when the protective grounding switch is turned on and the unlocking button is pressed.

Preferably, the interlocking control device for a multiple-unit safety circuit may further include:

a first pantograph interlocking control branch which includes: a normally-closed contact of the protective grounding switch and a coil of a pantograph rising relay which are connected in series, where the normally-closed contact of the protective grounding switch is opened and the coil of the pantograph rising relay is powered off when the protective grounding switch is turned on, such that a pantograph is unable to rise.

Preferably, the interlocking control device for a multiple-unit safety circuit may further include:

a second pantograph interlocking control branch, which includes: a normally-open contact of an emergency power-off relay, a normally-open contact of a pantograph rising relay and a pantograph-rising solenoid valve which are connected in series, where the normally-open contact of the emergency power-off relay is opened when the emergency power-off relay is powered off; and the coil of the pantograph rising relay is powered on and the normally-open contact of the pantograph rising relay is closed in a case that a pantograph rising condition is met, such that the pantograph-rising solenoid valve is powered on and the pantograph rises up.

Preferably, the interlocking control device for a multiple-unit safety circuit may further include:

a first emergency power-off control branch and a second emergency power-off control branch, where the first emergency power-off control branch includes: an emergency power-off button, a normally-open contact of an emergency power-off conditional relay and a coil of the emergency power-off relay which are connected in series;

the second emergency power-off control branch includes: a normally-closed contact of an external power supply state relay and a coil of the emergency power-off conditional relay which are connected in series; and the second emergency power-off control branch is connected in series with the emergency power-off button.

Preferably, the interlocking control device for a multiple-unit safety circuit may further include:

an external power supply state relay control branch which includes: an external power supply plug and a coil of the external power supply state relay which are connected in series, where the external power supply plug is closed when an external power supply is connected, to power on the coil of the external power supply state relay.

Preferably, the protective grounding switch control branch may further include: a protective grounding disconnecting control circuit breaker which is connected in series in the protective grounding switch control branch.

Preferably, the unlocking control branch may further include: an unlocking control circuit breaker which is connected in series in the unlocking control branch.

Preferably, the pantograph interlocking control branch may further include: a pantograph rising control circuit breaker which is connected in series in the pantograph interlocking control branch.

Preferably, the first emergency power-off control branch may further include: an emergency power-off control circuit breaker which is connected in series in the first emergency power-off control branch.

As compared with the conventional technology, the present disclosure provides at least the following advantages.

When high-voltage equipment on the multiple-unit train is under inspection and maintenance or is powered by an external power supply, it is necessary to ensure that no current flows through the high-voltage circuit, that is, to ensure that the pantograph does not rise up. A protective grounding switch is arranged in the train to prevent the pantograph from rising up in exceptional cases. The protective grounding switch is required to be maintained in the on state when the high-voltage equipment is under inspection and maintenance or is powered by an external power supply. In this case, when the pantograph rises up to power the high-voltage circuit, a low-impedance current circuit is provided for the high-voltage circuit through the protective grounding switch, thus personal safety of maintenance personnel is ensured.

BRIEF DESCRIPTION OF THE DRAWINGS

The drawings to be used in the description of the embodiments or the conventional technology will be described briefly hereafter, such that the technical solutions according to the embodiments of the present disclosure or in the conventional technology will become clearer. It is apparent that the drawings in the following description only illustrate some embodiments of the present disclosure. For those skilled in the art, other drawings may be obtained based on the provided drawings without any creative work.

DETAILED DESCRIPTION OF THE EMBODIMENTS

The technical solution according to the embodiments of the present disclosure is described clearly and completely as follows in conjunction with the accompanying drawings in the embodiments of the present disclosure, for those skilled in the art to better understand the technical solution of the present disclosure. It is apparent that the described embodiments are only a few rather than all of the embodiments of the present disclosure. Any other embodiment obtained by those skilled in the art based on the embodiments of the present disclosure without any creative work falls in the protection scope of the present disclosure.

Figure 1:
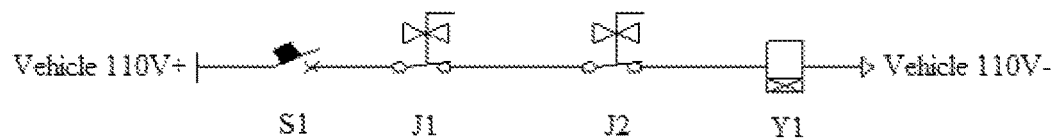
FIG. 1 is a schematic diagram of an interlocking control device for a multiple-unit safety circuit according to a first embodiment of the present disclosure.

Reference is made to FIG. 1, which is a schematic diagram of an interlocking control device for a multiple-unit safety circuit according to a first embodiment of the present disclosure.

The interlocking control device for a multiple-unit safety circuit according to this embodiment includes a protective grounding switch control branch.

The protective grounding switch control branch includes: a pantograph rising pneumatic circuit cut-off valve J1, a protective grounding switch turn-off pneumatic circuit cut-off valve J2 and a protective grounding switch turn-off solenoid valve Y1 which are connected in series.

When high-voltage equipment of a multiple-unit train is under inspection and maintenance or is supplied by an external power supply, a protective grounding switch is turned on, a cock of the pantograph rising pneumatic circuit cut-off valve J1 and a cock of the protective grounding switch turn-off pneumatic circuit cut-off valve J2 are rotated to pen a cover of a key box. Simultaneously, the protective grounding switch control branch is disconnected, the protective grounding switch turn-off solenoid valve Y1 connected in series in the protective grounding switch control branch is powered off, to ensure that the protective grounding switch cannot be turned off, that is, to ensure that the protective grounding switch is maintained in an on state.

The key box is located in an auxiliary air compressor.

The auxiliary air compressor is located in an under-frame equipment cabinet of a carriage provided with the pantograph.

The cover of the key box is mechanically locked by means of the pantograph rising pneumatic circuit cut-off valve J1 and the protective grounding switch turn-off pneumatic circuit cut-off valve J2.

Figure 2:
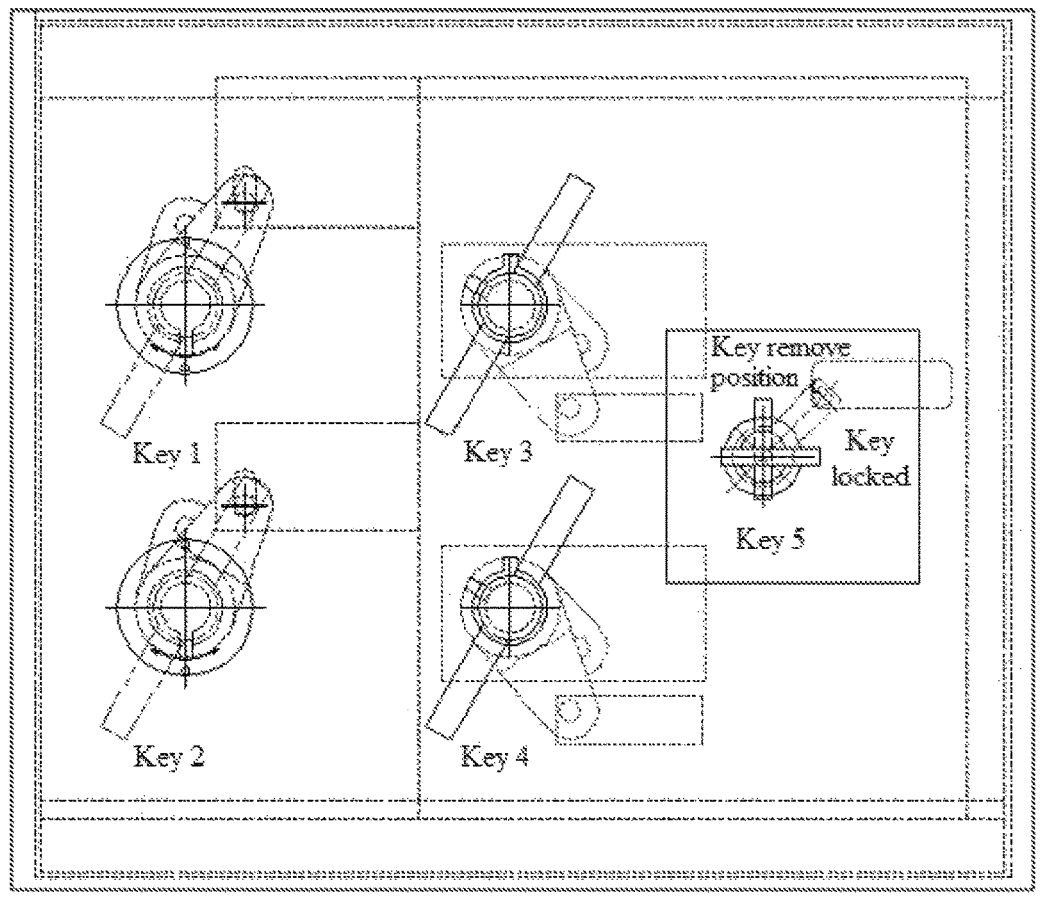
FIG. 2 is a schematic diagram of a key safety interlocking box according to the present disclosure.

Reference is made to FIG. 2, which is a schematic diagram of a key interlocking box.

It should be noted that, when high-voltage equipment of the multiple-unit train is under inspection and maintenance or is powered by an external power supply, it is necessary to ensure that no current flows through the high-voltage circuit, that is, to ensure that the pantograph does not rise up. A protective grounding switch is arranged in the train to prevent the pantograph from rising up in exceptional cases. The protective grounding switch is required to be maintained in the on state when the high-voltage equipment is under inspection and maintenance or is powered by an external power supply. In this case, when the pantograph rises up to power the high-voltage circuit, a low-impedance current circuit is provided for the high-voltage circuit through the protective grounding switch, thus personal safety of maintenance personnel is ensured.

A key for a high-voltage equipment cabinet or a key for an external power supply cabinet in the key interlocking box shown in FIG. 2 is to be taken out.

It should be understood that, the key for a high-voltage equipment cabinet or the key for an external power supply cabinet may be taken out by the following first to fourth steps.

In a first step, the cover of the key box in the auxiliary compressor is opened.

In a second step, key 1 and key 2 shown in FIG. 2 are unlocked.

In a third step, the key 1 and the key 2 are inserted into keyholes corresponding to the key 1 and key 2 shown in FIG. 2, to unlock key 3 and key 4, where the key 3 and the key 4 are used for opening the high-voltage equipment cabin, key 5 is used for opening the external power source cabin, and the keys are unable to be removed until maintenance of the cabinets is finished.

In a fourth step, the key 1 and the key 2 are also unable to be removed in a case that the key 3, the key 4 and the key 5 are not inserted into keyholes.

It should be noted that, both the key 1 and key 2 are taken out from the key box in the auxiliary compressor and inserted into the corresponding keyholes shown in FIG. 2 to open the high-voltage equipment cabinet or the external power source cabin.

It should be noted that, the protective grounding switch control branch shown in FIG. 1 further includes: a protective grounding disconnecting control circuit breaker S1.

The protective grounding disconnecting control circuit breaker S1 is connected in series in the protective grounding switch control branch.

Figure 3:
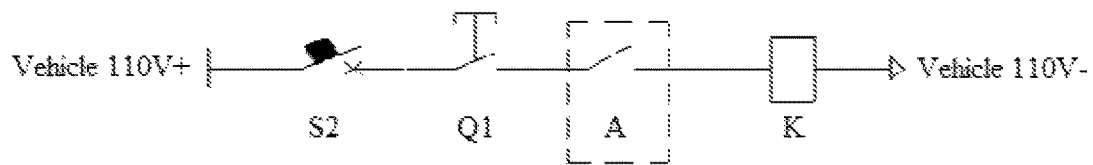
FIG. 3 is a schematic diagram of an interlocking control device for a multiple-unit safety circuit according to a second embodiment of the present disclosure.

Reference is made to FIG. 3, which is a schematic diagram of an interlocking control device for a multiple-unit safety circuit to a second embodiment of the present disclosure.

The interlocking control device for a multiple-unit safety circuit according to this embodiment further includes: an unlocking control branch.

The unlocking control branch includes: an unlocking button Q1, an auxiliary contact A of the protective grounding switch and an unlocking relay coil K which are connected in series.

The unlocking button Q1 is located on the key box.

The auxiliary contact A of the protective grounding switch is closed when the protective grounding switch is turned on.

The unlocking relay coil K is powered on to release a key when the protective grounding switch is turned on and the unlocking button Q1 is pressed.

In a normal condition, the key 1 and the key 2 are in a locked state in the key box. When the unlocking button Q1 on the key box is operated by operating personnel, the unlocking relay coil K is powered on to release the key 1 and the key 2.

The interlocking between taking out of the key 1 and the key 2 and the turning on of the protective grounding switch is achieved with the circuit shown in FIG. 3. Only when the protective grounding switch is turned on, the unlocking control branch in FIG. 2 is powered on, and the key 1 and the key 2 can be taken out. That is, when the protective grounding switch is turned off, the key 1 and the key 2 are unable to be taken out. Therefore, the interlocking between unlocking and the protective grounding switch is achieved.

In addition, the unlocking control branch in this embodiment further includes: an unlocking control circuit breaker S2.

The unlocking control circuit breaker S2 is connected in series in the unlocking control branch.

Figure 4:
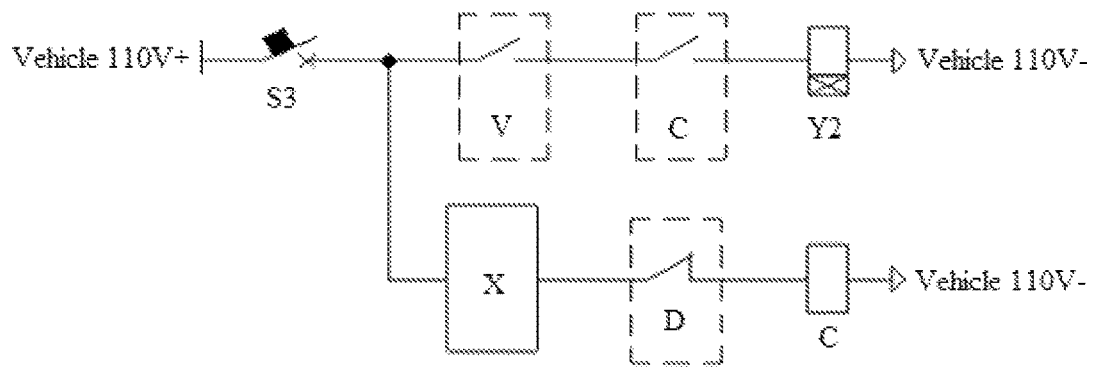
FIG. 4 is a schematic diagram of an interlocking control device for a multiple-unit safety circuit according to a third embodiment of the present disclosure.

Reference is made to FIG. 4, which is a schematic diagram of an interlocking control device for a multiple-unit safety circuit according to a third embodiment of the present disclosure.

The interlocking control device for a multiple-unit safety circuit according to this embodiment further includes: a first pantograph interlocking control branch.

The first pantograph interlocking control branch includes: a normally-closed contact D of the protective grounding switch and a coil C of a pantograph rising relay which are connected in series. In this embodiment, the coil of the pantograph rising relay and a normally-open contact of the pantograph rising relay are both indicated by C.

The normally-closed contact D of the protective grounding switch is opened and the coil C of the pantograph rising relay is powered off when the protective grounding switch is turned on, such that a pantograph is unable to rise.

In addition, the interlocking control device for a multiple-unit safety circuit further includes: a second pantograph interlocking control branch.

The second pantograph interlocking control branch includes: a normally-open contact V of an emergency power-off relay, a normally-open contact C of the pantograph rising relay and a pantograph rising solenoid valve Y2 which are connected in series.

The normally-open contact V of the emergency power-off relay is opened when the emergency power-off relay is powered off.

The coil C of the pantograph rising relay is powered on and the normally-open contact C of the pantograph rising relay is closed in a case that a pantograph rising condition is met, such that the pantograph-rising solenoid valve Y2 is powered on and the pantograph rises up.

When high-voltage equipment is under inspection and maintenance, the protective grounding switch is turned on firstly. The normally-closed contact D of the protective grounding switch is opened when the protective grounding switch is turned on, such that the pantograph rising relay is unable to be powered and the pantograph is unable to rise up.

In addition, the pantograph interlocking control branch further includes: a pantograph rising control circuit breaker S3. The pantograph rising control circuit breaker S3 is connected in series in the pantograph interlocking control branch.

Is should be noted that, X shown in FIG. 4 is another pantograph rising control condition of the train, which includes, for example, the pantograph being not cut off, a main circuit breaker of the vehicle being not closed, and the like.

Figure 5:
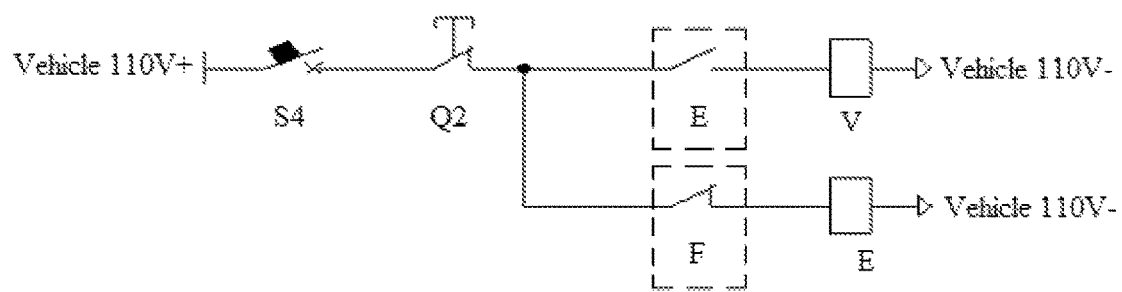
FIG. 5 is a schematic diagram of an interlocking control device for a multiple-unit safety circuit according to a fourth embodiment of the present disclosure.

Reference is made to FIG. 5, which is a schematic diagram of an interlocking control device for a multiple-unit safety circuit according to a fourth embodiment of the present disclosure.

The interlocking control device for a multiple-unit safety circuit according to this embodiment further includes: a first emergency power-off control branch and a second emergency power-off control branch.

The first emergency power-off control branch includes: an emergency power-off button Q2, a normally-open contact E of an emergency power-off conditional relay and a coil V of the emergency power-off relay which are connected in series.

It should be noted that, the normally-open contact of the emergency power-off relay in FIG. 4 and the coil of the emergency power-off relay in FIG. 5 are both indicated by V.

The second emergency power-off control branch includes: a normally-closed contact F of an external power supply state relay and a coil E of the emergency power-off conditional relay which are connected in series.

The second emergency power-off control branch is connected in series with the emergency power-off button Q2.

It should be noted that, the first emergency power-off control branch further includes: an emergency power-off control circuit breaker S4 which is connected in series with the first emergency power-off control branch. S4 is connected in series with Q2 as shown in FIG. 5.

Figure 6:
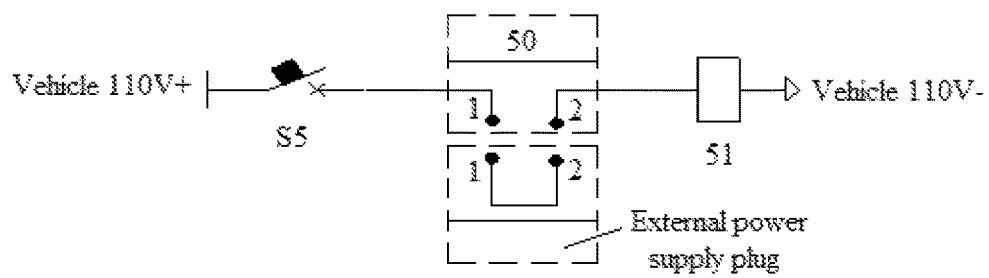
FIG. 6 is a schematic diagram of an interlocking control device for a multiple-unit safety circuit according to a fifth embodiment of the present disclosure.

Reference is made to FIG. 6, which is a schematic diagram of an interlocking control device for a multiple-unit safety circuit according to a fifth embodiment of the present disclosure.

The interlocking control device for a multiple-unit safety circuit according to this embodiment further includes: an external power supply state relay control branch.

The external power source state relay control branch includes: an external power supply plug 50 and a coil 51 of the external power supply state relay which are connected in series.

The external power supply plug 50 is closed when an external power supply is connected, to power on the coil 51 of the external power supply state relay.

When the external power supply is connected via the external power supply plug, the coil 51 of the external power supply state relay is powered, and the contact F is in an opened state. When F is opened, the coil E of the emergency power-off conditional relay is powered off, and the normally-open contact E of the emergency power-off conditional relay is switched from a closed state to an opened state, such that the coil V of the emergency power-off relay is powered off. When the emergency power-off relay is powered off, the contact V is opened to disconnect the pantograph-rising solenoid valve control circuit, such that the pantograph is unable to rise up.

It should be noted that, the external power supply state relay control branch further includes an external power supply control circuit breaker S5 connected in series with the external power supply state relay control branch.

As shown in FIGS. 4-6, safety interlocking of the pantograph rising control circuit is achieved. By interlocking a state of the protective grounding switch, an insertion state of an external power supply connector and the pantograph rising solenoid valve control circuit, the pantograph rising solenoid valve is unable to be powered on and the pantograph is unable to rise up when the protective grounding switch is turned on or the external power supply connector is inserted.

It should be understood that, all the circuit breakers S1-S5 in the above drawings are for protection, and are not associated with control logics of circuits.

It should be noted that, each of the control branches provided according to the above embodiments is powered by the 110V direct-current power supply on the train, that is, two terminals of the protective grounding switch control branch are respectively connected to DC110V+ and DC110V−, two terminals of the unlocking control branch are respectively connected to DC110V+ and DC110V−, two terminals of the pantograph interlocking control branch are respectively connected to DC110V+ and DC110V−, two terminals of the first emergency power-off control branch are respectively connected to DC110V+ and DC110V−, two terminals of the second emergency power-off control branch are respectively connected to DC110V+ and DC110V−, and two terminals of the external power supply state relay control branch are respectively connected to DC110V+ and DC110V−.

What is described above is only preferred embodiments of the present disclosure and is not intended to limit the present disclosure in any way. The preferred embodiments of the present disclosure are disclosed above, which should not be interpreted as limiting the present disclosure. Numerous alternations, modifications, and equivalents can be made to the technical solutions of the present disclosure by those skilled in the art in light of the methods and technical content disclosed herein without deviation from the scope of the present disclosure. Therefore, any alternations, modifications, and equivalents made to the embodiments above according to the technical essential of the present disclosure without deviation from the scope of the present disclosure should fall within the scope of protection of the present disclosure.

The invention claimed is:

1. An interlocking control device for a multiple-unit safety circuit, comprising:
   a protective grounding switch control branch which comprises: a pantograph rising pneumatic circuit cut-off valve, a protective grounding switch turn-off pneumatic circuit cut-off valve and a protective grounding switch turn-off solenoid valve which are connected in series, wherein
   when high-voltage equipment of a multiple-unit train is under inspection and maintenance or is powered by an external power supply, a protective grounding switch is turned on, a cock of the pantograph rising pneumatic circuit cut-off valve and a cock of the protective grounding switch turn-off pneumatic circuit cut-off valve are rotated to open a cover of a key box, the protective grounding switch control branch is disconnected, the protective grounding switch turn-off solenoid valve connected in series in the protective grounding switch control branch is powered off to maintain the protective grounding switch in an on state; and
   the cover of the key box is mechanically locked by means of the pantograph rising pneumatic circuit cut-off valve and the protective grounding switch turn-off pneumatic circuit cut-off valve.

2. The interlocking control device for a multiple-unit safety circuit according to claim 1, further comprising:
   an unlocking control branch which comprises: an unlocking button, an auxiliary contact of the protective grounding switch and an unlocking relay coil which are connected in series, wherein
   the unlocking button is located on the key box;
   the auxiliary contact of the protective grounding switch is closed when the protective grounding switch is turned on; and
   the unlocking relay coil is powered on to release a key when the protective grounding switch is turned on and the unlocking button is pressed.

3. The interlocking control device for a multiple-unit safety circuit according to claim 2, wherein the unlocking control branch further comprises: an unlocking control circuit breaker which is connected in series in the unlocking control branch.

4. The interlocking control device for a multiple-unit safety circuit according to claim 1, further comprising:
   a first pantograph interlocking control branch which comprises: a normally-closed contact of the protective grounding switch and a coil of a pantograph rising relay which are connected in series, wherein
   the normally-closed contact of the protective grounding switch is opened and the coil of the pantograph rising relay is powered off when the protective grounding switch is turned on, such that a pantograph is unable to rise.

5. The interlocking control device for a multiple-unit safety circuit according to claim 4 further comprising:
   a second pantograph interlocking control branch, which comprises: a normally-open contact of an emergency power-off relay, a normally-open contact of a pantograph rising relay and a pantograph-rising solenoid valve which are connected in series, wherein the normally-open contact of the emergency power-off relay is opened when the emergency power-off relay is powered off; and the coil of the pantograph rising relay is powered on and the normally-open contact of the pantograph rising relay is closed in a case that a pantograph rising condition is met, such that the pantograph-rising solenoid valve is powered on and the pantograph rises up.

6. The interlocking control device for a multiple-unit safety circuit according to claim 5 further comprising:

a first emergency power-off control branch and a second emergency power-off control branch, wherein the first emergency power-off control branch comprises: an emergency power-off button, a normally-open contact of an emergency power-off conditional relay and a coil of the emergency power-off relay which are connected in series;

the second emergency power-off control branch comprises: a normally-closed contact of an external power supply state relay and a coil of the emergency power-off conditional relay which are connected in series; and the second emergency power-off control branch is connected in series with the emergency power-off button.

7. The interlocking control device for a multiple-unit safety circuit according to claim 6 further comprising:

an external power supply state relay control branch which comprises: an external power supply plug and a coil of the external power supply state relay which are connected in series, wherein the external power supply plug is closed when an external power supply is connected, to power on the coil of the external power supply state relay.

8. The interlocking control device for a multiple-unit safety circuit according to claim 6, wherein the first emergency power-off control branch comprises: an emergency power-off control circuit breaker which is connected in series in the first emergency power-off control branch.

9. The interlocking control device for a multiple-unit safety circuit according to claim 4, wherein the pantograph interlocking control branch further comprises: a pantograph rising control circuit breaker which is connected in series in the pantograph interlocking control branch.

10. The interlocking control device for a multiple-unit safety circuit according to claim 1, wherein the protective grounding switch control branch further comprises: a protective grounding disconnecting control circuit breaker which is connected in series in the protective grounding switch control branch.

* * * * *